United States Patent [19]

Yamanouchi et al.

[11] Patent Number: 4,873,713
[45] Date of Patent: Oct. 10, 1989

[54] AUTOMATIC TELEPHONE ANSWERING APPARATUS AND METHOD

[75] Inventors: Kiyoshi Yamanouchi; Sumio Iwase, both of Tokyo, Japan

[73] Assignee: Sony Corporation, Tokyo, Japan

[21] Appl. No.: 118,402

[22] Filed: Nov. 6, 1987

[30] Foreign Application Priority Data

Nov. 10, 1986 [JP] Japan .................................. 61-267304

[51] Int. Cl.⁴ ............................................. H04M 1/64
[52] U.S. Cl. ....................................... 379/67; 379/69; 379/77; 379/88
[58] Field of Search ....................... 379/69, 67, 88, 77, 379/89

[56] References Cited

U.S. PATENT DOCUMENTS 4,525,600 6/1985 Hashimoto ............................. 379/70
4,625,081 11/1986 Lotito et al. ........................... 379/89
4,640,991 2/1987 Matthews et al. ..................... 379/88

FOREIGN PATENT DOCUMENTS 0055654 4/1982 Japan ...................................... 379/69
0059844 4/1985 Japan ...................................... 379/88
0253360 12/1985 Japan ...................................... 379/88

Primary Examiner—Thomas W. Brown
Attorney, Agent, or Firm—Philip M. Shaw, Jr.

[57] ABSTRACT

An automatic telephone answering apparatus answers and records incoming calls and then automatically dials, repeatedly if necessary, a remote telephone whose number has been stored in the answering apparatus and reproduces a specific message which notifies the person answering the remote telephone that a message has been received and recorded for the user of the answering apparatus.

6 Claims, 1 Drawing Sheet

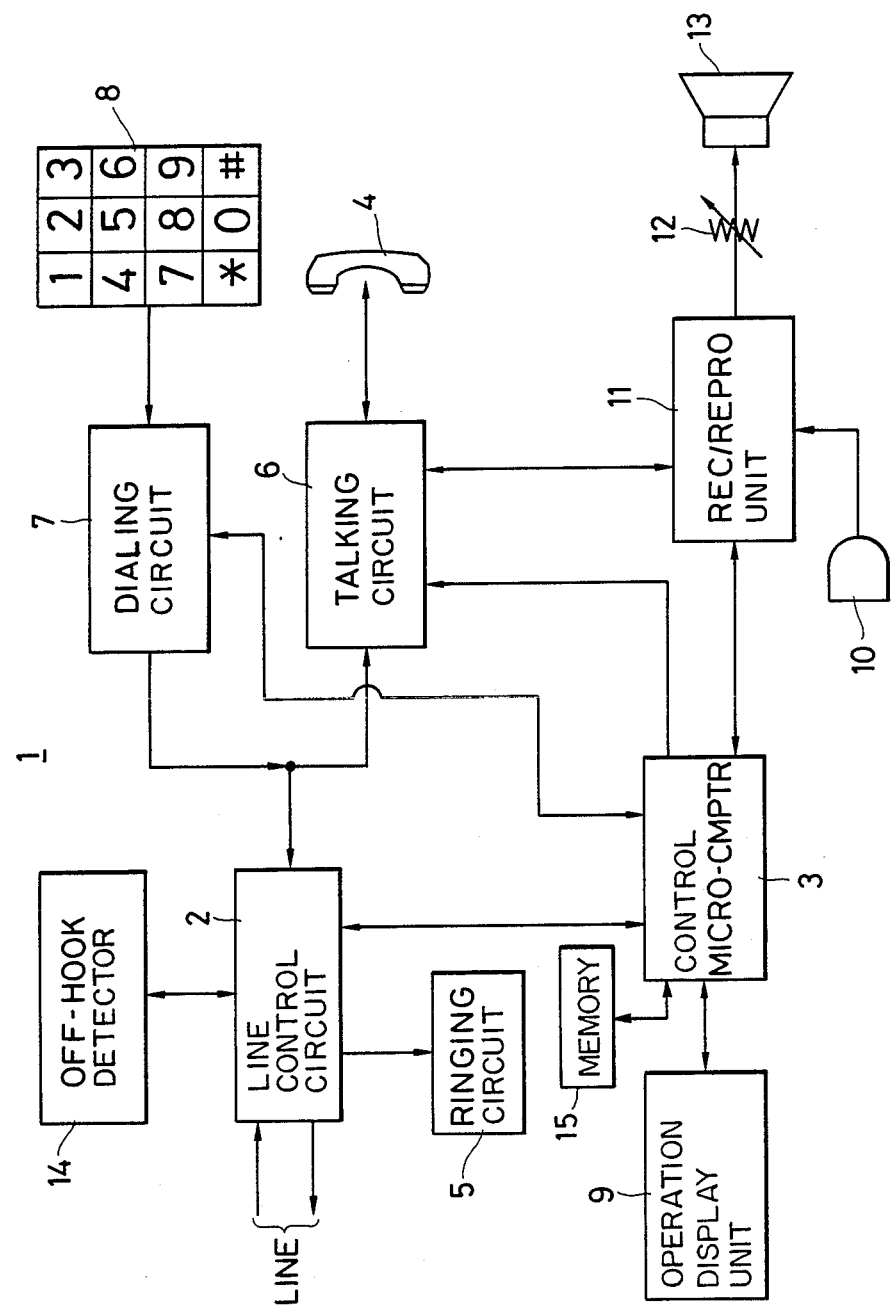

AUTOMATIC TELEPHONE ANSWERING APPARATUS AND METHOD

BACKGROUND OF THE INVENTION

1. Field of the Invention

The present invention relates to an automatic telephone answering apparatus, the method performed by it and, more particularly, to an automatic telephone answering apparatus which is capable of sending a specific message to a specific destination of a user after an incoming message is recorded.

2. Description of the Prior Art

In a conventional automatic telephone answering apparatus, when an incoming call is detected while a user is out, an outgoing message prerecorded in a recording medium, such as a magnetic tape or a solid-state memory, is reproduced to inform the caller that the called party is out. Thereafter, an incoming message from the calling party is recorded on the magnetic tape or in the solid-state memory.

In another conventional automatic telephone answering apparatus described in U.S. Pat. No. 4,065,642 (McClure), automatic dialing is performed for a destination telephone set at a remote location where the user is to be in order to inform the user that an incoming message was recorded while the user was out. In such an automatic telephone answering apparatus, a telephone number of the destination telephone set is stored in a storage device such as a memory, and the remote telephone set is accessed on the basis of the stored telephone number upon completion of the recording of the incoming message. At the same time, cyclic beep tones of an INTER signal are sent. When the user answers the phone, i.e., the destination telephone set is set in the off-hook state, the user can listen to the beep tones and known that the incoming message has been recorded.

After the user listens to the beep tones, he or she sends a remote control signal having a specific code by using the numerical keys of the key telephone system located at the remote place where the user is present. The recorded incoming message can then be automatically played back to the user.

However, when the remote telephone set cannot be set in the off-hook state, for example because it is in use, the apparatus calls the user within a predetermined period of time and stops calling the user after the lapse of the predetermined period of time.

Assume that the user or any person other than the user answers the phone and listens to the beep tones and did not send back the remote control signal to the automatic telephone answering apparatus. In this case, the automatic telephone answering apparatus continuously sends the beep tones within the predetermined period of time and stops sending them after the lapse of the period. In this case, the telephone circuit is disengaged from the telephone lines, and the automatic telephone answering apparatus calls the user again when a predetermined period (e.g., five minutes) has elapsed.

If the user or the person other than the user is not present again or the remote control signal is not sent back to the automatic telephone answering apparatus, it calls the destination telephone set after a predetermined period of time (e.g., 15 minutes) has elapsed. A plurality of calls are then made at intervals of 30 and 60 minutes in the same manner as described above.

In the conventional automatic telephone answering apparatus in which the user is informed by beep tones that the incoming message has been recorded, if a person other than the user answers the remote phone and does not know the meaning of the beep tones, this person does not know from where the call is being made and to whom the call is being made. The person may believe that this call is a wrong call. When the predetermined period of time has elapsed, the call from the automatic telephone answering apparatus is stopped. Because of this problem, such calls often cannot be made to the user, and the primary purpose of the beep tones often cannot be achieved.

Although the subsequent calls are made a plurality of times, i.e., after the lapses of 15, 30, and 60 minutes, if a person other than the user answers the remote phone again, the primary purpose cannot be realized. In addition, the person answering the remote phone may feel anxious because he only hears the unintelligible beep tones.

SUMMARY OF THE INVENTION

It is a first object of the present invention to provide an automatic telephone answering apparatus which is capable of forwarding to a remote phone a message of an incoming recorded call, specifying the name of the called party (e.g., the name of the user while he is out) in words by utilizing a specific message, so that notice of the recording of the incoming message in the apparatus can be given to the user at a remote telephone no matter who answers the remote phone.

It is a second object of the present invention to provide an automatic telephone answering apparatus having a message forwarding feature wherein any person other than the user can know to whom the call is being made and which will inform the user that an incoming message has been recorded.

It is third object of the present invention to provide an automatic telephone answering apparatus having a message forwarding feature wherein once any person answers the remote phone, subsequent calls are inhibited, and the person can neither listen to the same message nor answer the repeated call.

The foregoing and other objectives, features and advantages of the invention will be more readily understood upon consideration of the following detailed description of certain preferred embodiments of the invention, taken in conjunction with the accompanying drawing.

BRIEF DESCRIPTION OF THE DRAWING

The drawing is a block diagram showing an embodiment of the present invention.

DETAILED DESCRIPTION OF THE PREFERRED EMBODIMENT

Referring to the drawing, a line control circuit 2 connects an automatic telephone answering apparatus 1 to telephone lines LINE and includes a hook switch and a relay (not shown). The circuits in the automatic telephone answering apparatus 1 are controlled by a control microcomputer 3 and are operated at predetermined times as controlled by the microrocmputer 3 in response to a stored program.

When the automatic telephone answering apparatus 1 is used as a normal telephone set and a handset 4 is set in the on-hook state, the apparatus 1 is set in an incoming/outgoing call standby state. If an incoming call is made, a ringing circuit 5 is driven through the line control circuit 2 and audible ringing tones are then produced. If the subscriber, i.e. the user picks up the handset 4, a hook switch (not shown) is closed and the microcomputer 3 detects this and deenergizes the ringing circuit 5 through the line control circuit 2 and energizes a talking circuit 6 which is then engaged through the line control circuit 2 with the telephone lines, thus achieving a busy state. A dialing circuit 7 is also energized by the microcomputer 3 at the same time. The user can dial using numerical keys 8 to make an outgoing call.

The operation for recording an incoming message in the automatic telephone answering apparatus will now be described. An operation/display unit 9, which includes operation buttons and switches for setting a desired operation mode and a display unit for displaying the operation mode, is connected to the microcomputer 3. In the following description, the appropriate buttons and switches are assumed to be operated by the user in the proper sequence to achieve the described result.

(a) The automatic telephone answering apparatus is set in a "telephone" mode while the user is at home by pressing a button (not shown) in the operation/display unit 9, and the user then sets the automatic telephone answering apparatus in an outgoing message recording mode.

(b) The user then records an outgoing message with a microphone 10 connected to a recording/reproducing unit 11. The message recording medium may be a magnetic tape, a solid-state memory, or the like, (c) The recorded outgoing message can be automatically monitored using a volume control 12 and a loudspeaker 13 after the recording/reproducing unit 11 is set in the reproduction mode. Therefore, the user can confirm the contents of the recorded outgoing message.

(d) The user sets the automatic telephone answering apparatus in a relay message recording mode by using operation buttons, and a relay message is recorded through the microphone 10 and the recording/reproducing unit 11 in the same manner as described above. The relay message can be automatically monitored in the same manner as in operation (c). The relay message is, e.g., "This is an automatic telephone answering apparatus. May I speak to Mr. so-and-so." In this case, the sentence "An incoming message has been recorded" may be added to the end of the above relay message. "Mr. so-and-so" is the name of the user or the name of a specific person who can listen to the recorded incoming message.

(e) The user enters a telephone number of the remotely located telephone where the user intends to be (the remote place is the destination of the relay message) using the numerical keys 8. The telephone number data is stored in, e.g., a memory 15 which, although for purposes of clarity is shown exterior to the microcomputer 3, is actually part of it.

(f) The user sets the automatic telephone answering apparatus in the automatic answering mode by using operation buttons and goes to the remote destination.

(g) When an incoming call is received at the apparatus 1 while the user is out, the call is detected by the line control circuit 2 connected to the lines.

(h) The recording/reproducing unit 11 is automatically set by the microcomputer 3 in the reproduction mode, and the above outgoing message is reproduced. This message is transmitted to the calling party through the recording/reproducing unit 11, the talking circuit 6, the line control circuit 2, and the lines.

(i) When reproduction of the outgoing message is completed, a signal tone, i.e., a beep tone is sent to the calling party, and at the same time, the recording/reproducing unit 11 is set by the microcomputer 3 in the recording mode.

(j) When the incoming message from the calling party is completely recorded, as detected by the microcomputer by, for example, the cessation of voice signals on the line or by the elapse of a predetermined period of time, the automatic telephone answering apparatus is disconnected from the telephone line by the microcomputer 3.

(k) When a predetermined period of time (e.g., 10 seconds) has elapsed upon completion of recording of the incoming message, the telephone number stored in the memory in the microcomputer 3 is automatically read out and the microcomputer performs a first automatic dialing to the remote telephone set where the user is supposed to be through the dialing circuit 7 and the line control circuit 2.

(l) When the handset of the remote telephone is picked up in response to ringing tones, the off-hook state of the destination telephone set is detected by an off-hook detector 14 in the telephone answering apparatus 1 in the following manner.

When a ringing signal is sent to a telephone set and its handset is picked up, a DC line voltage is inverted to calculate a telephone rate on the basis of the voltage inversion. In this embodiment, inversion of the DC voltage for the lines connected to the line control circuit 2 is detected by the off-hook detector 14, thereby detecting that the handset of the remote telephone set is picked up.

(m) The detection of the off-hook state of the remote telephone by the off-hook detector 14 is conveyed to the microcomputer 3 which activates the recording/reproducing unit 11. The recording/reproducing unit 11 is then set in the reproduction mode and the relay message is immediately reproduced and sent over the telephone lines to the remote telephone set. Reproduction of the relay message is repeatedly performed within a predetermined period of time. It should be noted that in some less preferred embodiments the relay message can be sent out at the start of dialing regardless of the presence or absence of the off-hook detection signal in operation (l).

(n) If the person who picks up the handset of the remote telephone set is the person for whom the message is intended, i.e. the user of the apparatus 1, he can listen to the relay message and immediately know that the incoming message has been recorded in the automatic telephone answering apparatus 1.

(o) Even if a person other than the user picks up the handset of the remote telephone set, the person listens to the name, i.e., "Mr. so-and-so" presented by the relay message and can immediately call the user (or the specific person; this applies to the following description). The called person can hear the relay message through the handset and can know that an incoming message has been recorded.

(p) The user, having been apprised that an incoming message has been recorded in operation (n) or (o), can send back a remote control signal such as a predetermined personal identification number or a reproduction command signal through the telephone lines to the automatic telephone answering apparatus 1 by using the numerical keys of the remote telephone set. The recording/reproducing unit 11, upon receipt of the remote control signal over the telephone lines, is set in the reproduction mode, and the recorded incoming message is sent to the user through the telephone lines.

(q) After the detection of the off-hook state, if the predetermined remote control signal which is supposed to be sent is not received while the relay message is sent within a predetermined period of time, e.g., 30 seconds, the automatic telephone apparatus 1 stops sending the relay message and is disengaged from the telephone lines. In this case, subsequent dialing is not performed.

(r) If nobody is present to answer the remote telephone set, the off-hook detector 14 does not defect the off-hook state of the remote telephone set. In this case, dialing for the remote telephone set is performed for a given period of time, e.g., 50 seconds. Thereafter, a second dialing for the remote telephone set is performed, e.g., five minutes after the first dialing.

(s) If no off-hook state is detected in response to the second dialing, a third dialing is performed 15 minutes after the second dialing. Similarly, further dialings are repeated after 30 and 60 minutes. In this manner, dialing is repeated a plurality of times (e.g., five times). A counter (not shown) and a timer (not shown) are arranged in the microcomputer 3, and the automatic dialing count (e.g., five) is preset in the counter and the dialing intervals are preset by the timer.

(t) If an off-hook state is detected by the circuit 14 in response to any one of a predetermined number of dialing operations, e.g., five times, the relay message is sent within 30 seconds. Subsequent dialing is then inhibited. If the off-hook state is detected in response to the second dialing, third and subsequent dialing operations are inhibited. In this case, even if the person who answers the phone is not the user himself, this person will inform the user of the contents of the relay message. Therefore, the user can know that the incoming message has been recorded in the automatic telephone answering apparatus 1. The user calls the automatic telephone apparatus 1 and sends the remote control signal thereto. Alternatively, the user can go home and directly operate the automatic telephone answering apparatus 1. The recorded incoming message is reproduced and the user can know the contents thereof.

Therefore, even if the off-hook state is detected in response to any one of the dialing operations and the subsequent dialing operations are inhibited, it does not cause any problem. A person (the user or any person other than the user) who is present at the remote telephone will neither repeatedly answer the phone nor repeatedly hear the relay message.

Operations (g) to (t) are performed whenever a new incoming message from a calling party is recorded in the automatic telephone answering apparatus 1.

Although the present invention has been shown and described with respect to preferred embodiments, various changes and modifications which are obvious to a person skilled in the art to which the invention pertains are deemed to lie within the spirit and scope of the invention.

What is claimed is:

1. An automatic telephone answering apparatus comprising:
   first recording/reproducing means for connection to a telephone line for recording and reproducing an outgoing message from a subscriber and sending it to a calling party in response to an incoming call over said telephone line from said calling party, second recording/reproducing means for recording and reproducing an incoming message from said calling party after the outgoing message is sent, and third recording/reproducing means for selectively recording and reproducing a specific message from a subscriber to be sent to a predetermined telephone set designated by the subscriber, the specific message constituting a relay message for supplying information that at least one incoming message has been recorded by said recording/reproducing means;
   telephone number storing means for receiving from the subscriber a telephone number of the predetermined telephone set designated by the subscriber and storing said telephone number;
   automatic dialing means for automatically calling said predetermined telephone set according to said stored telephone number upon completion of recording of the incoming message, wherein said automatic dialing means repeatedly calls said predetermined telephone set a plurality of times within a predetermined period of time;
   specific message sending means for causing said specific message to be reproduced by said third recording/reproducing means upon automatic dialing by said automatic dialing means and for sending said specific message to said predetermined telephone set dialed by said automatic dialing means and thereafter selectively causing the recorded incoming message to be reproduced by said second recording/reproducing means and sending it to said predetermined telephone set;
   off-hook detecting means for detecting an off-hook state of said predetermined telephone set in response to dialing by said automatically dialing means and wherein said specific message sending means causes said specific message to be reproduced and sent from said third recording/reproducing means upon detection of the off-hook state by said off-hook detecting means;
   wherein said automatic dialing means further comprises:
      redialing means for performing automatic redialing a predetermined number of times when a predetermined period of time has elapsed upon completion of a previous automatic dialing; and
      inhibiting means for energizing said redialing means when the off-hook state is not detected by said off-hook detecting means in response to automatic dialing and for energizing said specific message sending means and deenergizing said redialing means to prevent subsequent redialing operations when the off-hook state is detected by said off-hook detecting means in response to automatic dialing.

2. A method for automatically answering a telephone and forwarding a notification of a recorded message to a predetermined telephone, comprising the steps of:
   recording and automatically reproducing an outgoing message from a subscriber and sending it over a telephone line to a calling party in response to an incoming call over said telephone line from said calling party;
   automatically recording an incoming message from said calling party over a telephone line after the outgoing message is sent;
   selectively recording a specific message from the subscriber to be sent to a predetermined telephone set designated by the subscriber, wherein said specific message comprises a relay message for informing that at least one incoming message has been recorded;

electronically receiving from the subscriber a telephone number of the predetermined telephone set and storing said telephone number;

electronically reading out said stored telephone number and automatically dialing said predetermined telephone set a plurality of times within a predetermined period of time upon completion of the recording of the incoming message;

automatically reproducing and sending said specific message over the telephone line to said automatically dialed, predetermined telephone set;

detecting an off-hook state of said predetermined telephone set in response to said automatic dialing and sending said specific message upon detecting the offhook state;

automatically redialing said predetermined telephone a predetermined number of times when a predetermined period of time has elapsed upon completion of a previous automatic dialing and the off-hook state is not detected in response to automatic dialing;

when the off-hook state is detected, performing said specific message sending step and inhibiting said redialing step to prevent subsequent redialing.

3. An automatic telephone answering apparatus as recited in claim 1 wherein the relay message informs a named person that at least one incoming message has been recorded by said second recording/reproducing means.

4. A method for automatically answering a telephone and forwarding a notification of a recorded message to a predetermined telephone as recited in claim 2 wherein the relay message informs a named person that at least one incoming message has been recorded for said person.

5. An automatic telephone answering apparatus as recited in claim 1 wherein the third recording/reproducing means further detects the presence or absence of a specific remote control signal sent from said predetermined telephone set within said predetermined period of time while said specific message sending means is causing said specific message to be sent;

reproduces said incoming message and sends said incoming message to said predetermined telephone set when the remote control signal is detected; and blocks the sending of said specific message and disconnects said automatic telephone answering apparatus from said predetermined telephone set when the remote control signal is not detected within said predetermined period of time.

6. A method for automatically answering a telephone and forwarding a notification of a recorded message to a predetermined telephone as recited in claim 2 further comprising the steps of:

detecting the presence or absence of a specific remote control signal sent over the telephone line from said predetermined telephone set within a predetermined period of time while said specific message is being sent;

automatically reproducing said incoming message and sending said incoming message to said predetermined telephone set when the remote control signal is detected; and blocking the sending of said specific message and disconnecting from said predetermined telephone set when the remote control signal is not detected within said predetermined period of time.

* * * * *